April 12, 1932.  R. G. ALLEN  1,853,714
CAM MECHANISM FOR GLASS BLOWING MACHINES
Filed Aug. 4, 1928   3 Sheets-Sheet 1
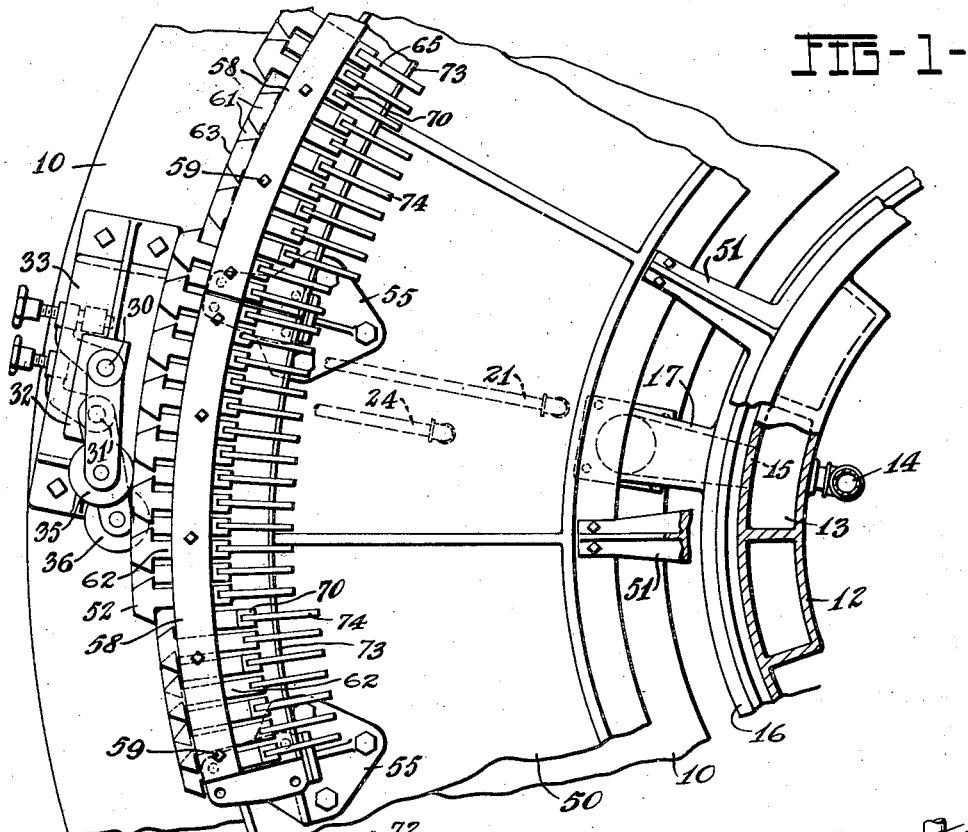
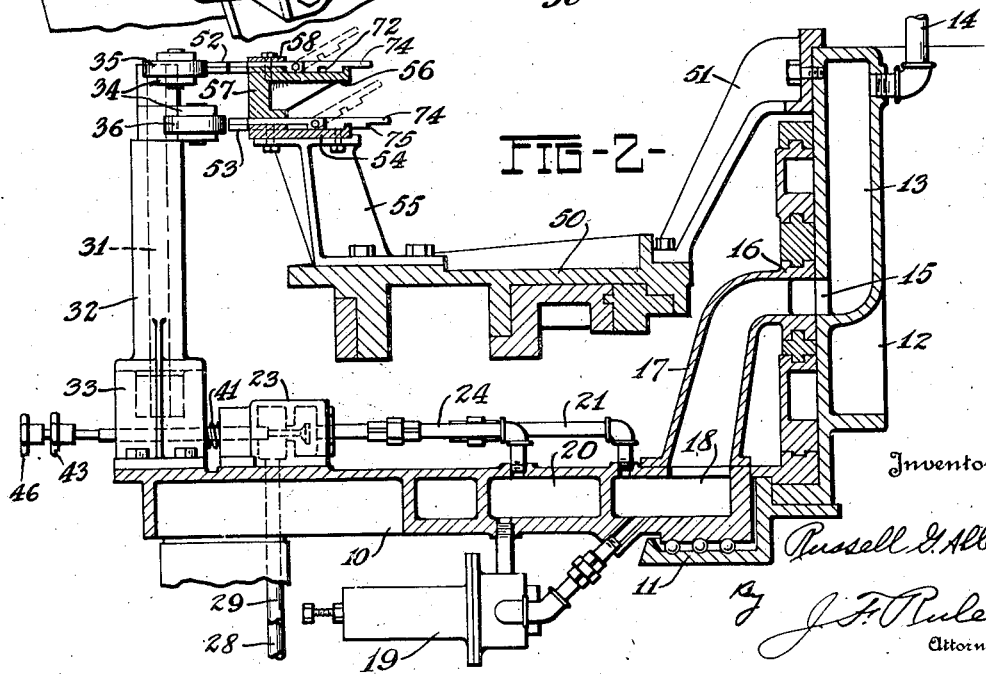
Inventor
Russell G. Allen
By J. F. Rule
Attorney April 12, 1932. R. G. ALLEN 1,853,714
CAM MECHANISM FOR GLASS BLOWING MACHINES
Filed Aug. 4, 1928   3 Sheets-Sheet 2
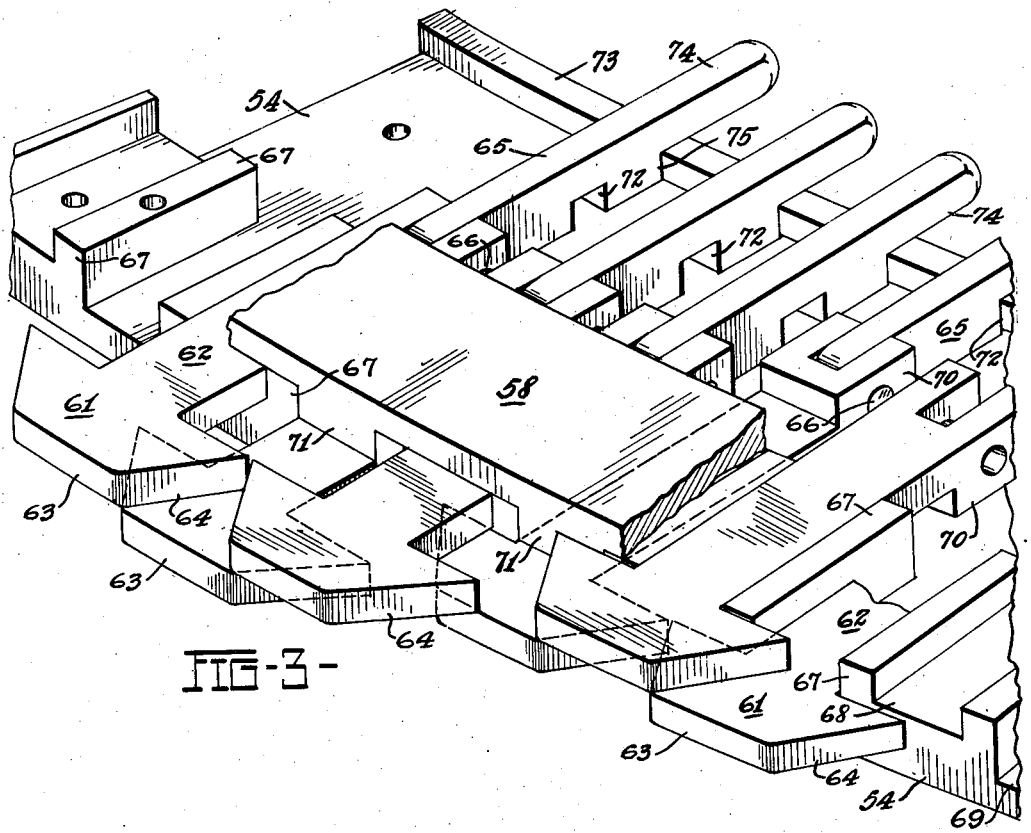
FIG-3-
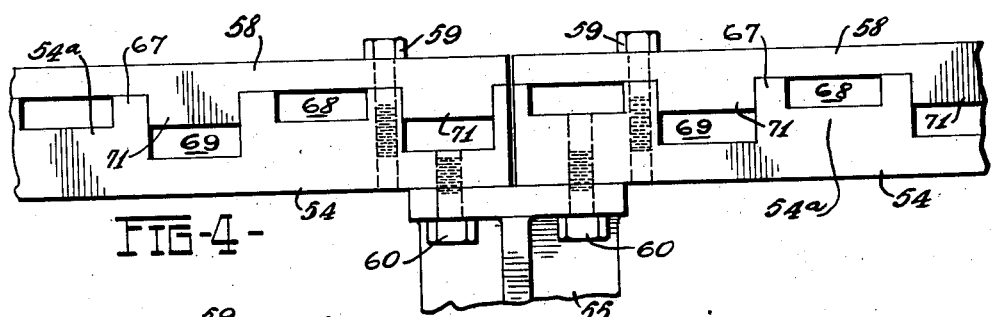
FIG-4-
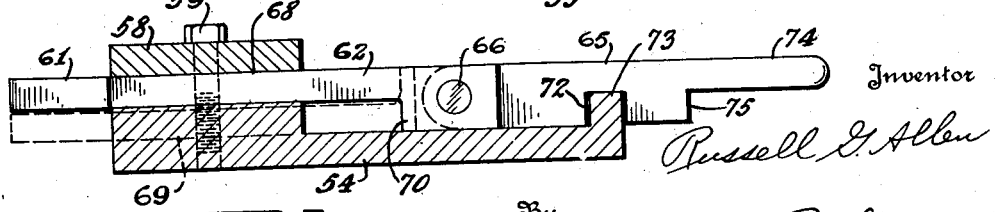
FIG-5-
Inventor
Russell G. Allen
By
J. F. Rule,
Attorney April 12, 1932. R. G. ALLEN 1,853,714
CAM MECHANISM FOR GLASS BLOWING MACHINES
Filed Aug. 4, 1928  3 Sheets-Sheet 3
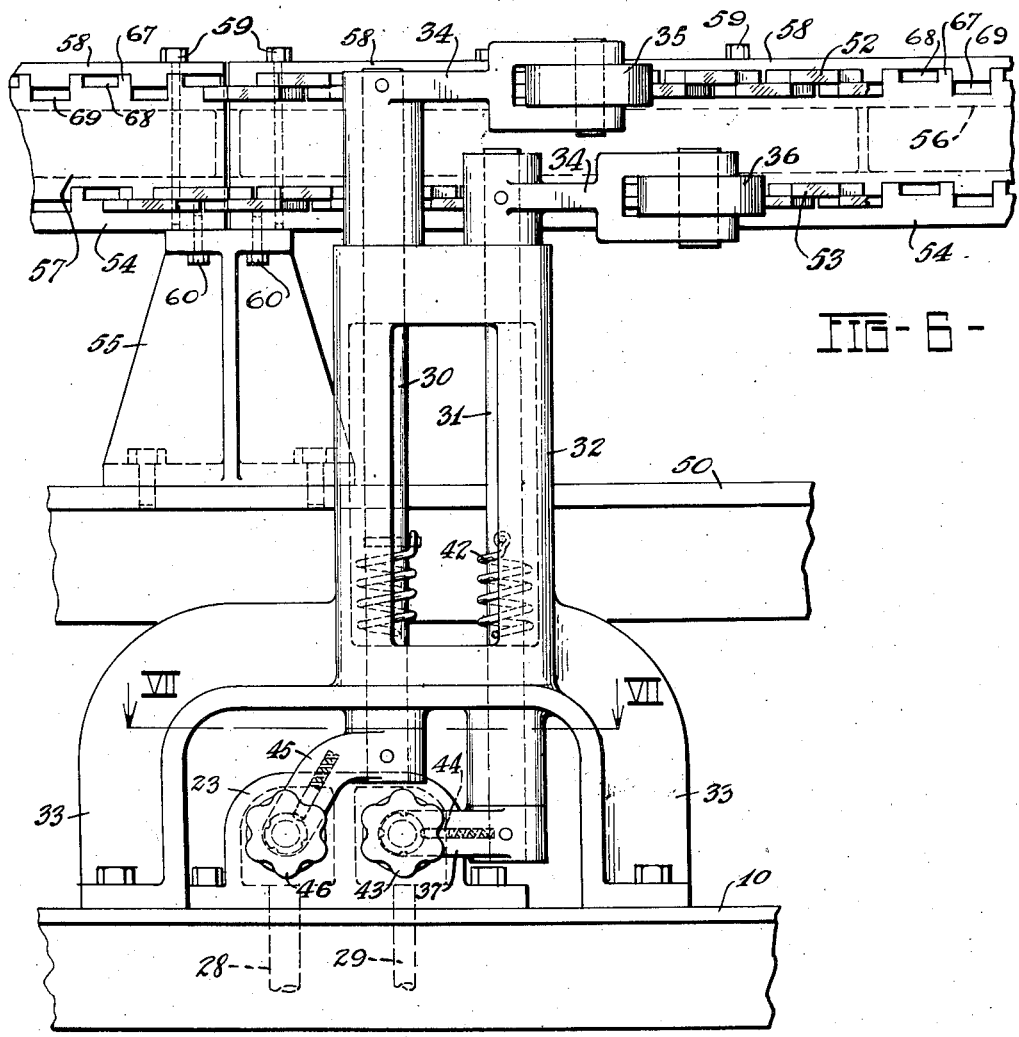
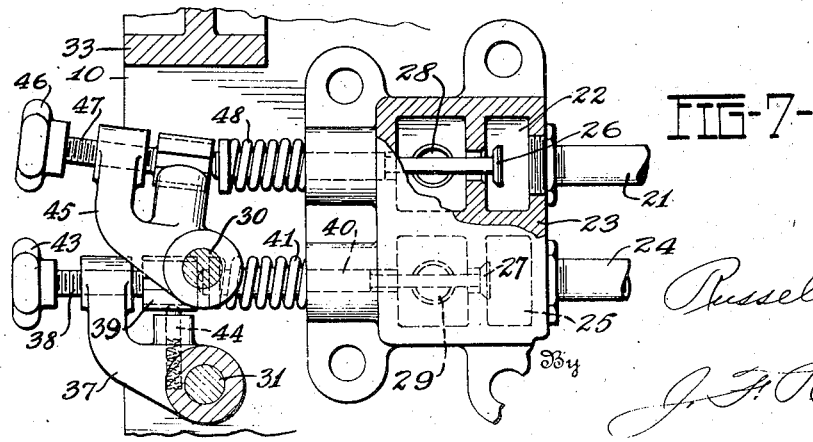
Inventor
Russell G. Allen
By J. F. Rule,
Attorney Patented Apr. 12, 1932

1,853,714

UNITED STATES PATENT OFFICE

RUSSELL G. ALLEN, OF TOLEDO, OHIO, ASSIGNOR TO OWENS-ILLINOIS GLASS COMPANY, OF TOLEDO, OHIO, A CORPORATION OF OHIO

CAM MECHANISM FOR GLASS BLOWING MACHINES

Application filed August 4, 1928. Serial No. 297,397.

My invention relates to cam mechanism which, as herein disclosed, is particularly adapted for controlling air valves on an automatic machine for blowing hollow glass articles, although it is to be understood that various features of the invention may be used in other situations and for other purposes.

In automatic machines for making bottles, jars and other hollow glass articles which are blown in molds, there are usually several blowing operations effected in the formation or fabrication in the molds of each article. The molds are ordinarily carried on a continuously rotating mold carriage and the blowing operations take place in the molds while they rotate with the carriage. The valves for controlling the air supply to the molds are usually actuated by stationary cams cooperating with valve operating devices on the rotating carriage. It is often desirable to change the point at which, during the travel of the mold, an air valve is opened by a stationary cam for the commencement of a blowing operation. It is also frequently desirable to change the length of time during which the blowing is continued. Changes of this character are required when the molds on the machine are changed for making bottles of other sizes or shapes. Also, varying conditions such as changes in the condition or temperature of the glass, temperature of the molds, etc., frequently make it desirable to change the length or position of the cams controlling the blowing operations.

An object of the present invention is to provide improved means whereby the position and length of each cam may be quickly adjusted through any desired range of adjustments and without interrupting the continuous operation of the machine.

Other objects of the invention will appear hereinafter.

In the accompanying drawings:

Fig. 1 is a fragmentary plan view of a portion of a machine for blowing hollow glass articles and shows, particularly, the cam table and a group of cams thereon.

Fig. 2 is a fragmentary sectional elevation of mechanism shown in Fig. 1.

Fig. 3 is a perspective view on a larger scale, showing a cam plate and a group of cams thereon.

Fig. 4 is a fragmentary elevation view showing adjoining cam plates and retaining plates for the cams.

Fig. 5 is a sectional elevation showing a cam plate and cams thereon.

Fig. 6 is a fragmentary front elevation showing the cam actuated rolls and rock shafts.

Fig. 7 is a part sectional fragmentary view showing the valve box, valves and valve actuating mechanism.

Referring to Figs. 1 and 2, the glass blowing machine in connection with which my invention is shown, comprises a continuously rotating mold carriage including an upper section or casting 10 having bearings on a stationary annular plate 11 mounted on the center column of the machine. A stationary drum 12 mounted centrally of the machine is formed with a series of channels or passageways including a channel 13 to which air under pressure is supplied through a pipe 14. The air passes through a port 15 to a distributing ring 16 which surrounds the drum 12. Said ring is formed with a hollow bracket arm 17 by means of which the ring is connected to the carriage 10 and through which the air is conducted to a high pressure air chamber 18. A pressure reducing valve 19 has pipe connections with the high pressure chamber 18 and a low pressure chamber 20, both said chambers being formed in the casting 10. Air is supplied to the chamber 20 and maintained at a comparatively low constant pressure by means of the reducing valve.

Air from the high pressure chamber 18 is conducted through a pipe 21 (Figs. 2 and 7) to a chamber 22 in a valve box 23. Air from the low pressure chamber 20 is conducted through a pipe 24 to a chamber 25 in the valve box. Valves 26 and 27 in the valve box respectively control the supply of high and low pressure air to pipes 28 and 29 through which the air is conducted to blowing heads or other devices on the mold carriage.

The valve box 23, as shown in Fig. 2, is mounted on the section 10 of the rotating mold carriage. Mechanism for actuating the valves includes a pair of vertically disposed rock shafts 30 and 31 journalled in a frame 32 including standards 33 bolted to the mold carriage. Secured to the upper ends of the rock shafts 30 and 31 are rock arms 34 which carry cam rolls 35 and 36 which run on stationary cams as hereinafter set forth. Secured to the lower end of the rock shaft 31 is a rock arm 37 in which is threaded an adjusting screw 38 carrying a head 39 which bears against the outer end of the valve stem 40 of the valve 27. Said valve is held on its seat by a coil spring 41 surrounding the valve stem. The head 39 is held against the valve stem with a yielding pressure by means of a coil spring 42 (Fig. 6) surrounding the rock shaft 31, said spring being connected at one end to the rock shaft and having its other end bearing against the frame 32. The spring 42 tends to rotate the rock shaft in a direction to hold the head 39 against the valve stem but with insufficient pressure to overcome the tension of the spring 41. The valve, therefore, remains closed except when positively operated by the cam, as hereinafter described.

When the shaft 31 is rocked by means of the cam, the valve is opened to an extent determined by the adjustment of the screw 38. The latter is rotated by a hand wheel 43 keyed thereto and is held in adjusted position by a spring actuated detent 44 mounted in the arm 37 and engaging grooves formed in the head 39. The mechanism for adjusting and operating the valve 26 is substantially the same as that just described in connection with the valve 27. It includes a rock arm 45 on the shaft 30, a hand wheel 46, adjusting screw 47 engaging the stem of the valve 26, and a coil spring 48 for closing the valve.

The cam mechanism is supported on a stationary cam table 50. This table in the form shown, is an annular casting supported by inclined bracket arms 51 bolted at their lower ends to said table, and at their upper ends to the stationary drum 12. Two series of cams are provided, namely, an upper series of cams 52 for actuating the high pressure valve 26, and a lower series of cams 53 for actuating the low pressure valve 27. The cams 53 are mounted on a cam ring comprising a plurality of curved cam plates or sections 54 placed end to end, concentric with the vertical axis of rotation of the mold carriage. The sections 54 are supported on brackets 55 mounted on the cam table 50, there being a bracket beneath each two adjoining ends of said sections.

The upper set of cams is mounted on a ring of cam plates or sections 56, each of which comprises a horizontally disposed cam supporting face and a vertical flange portion 57 extending downward therefrom and resting on the cam plate 54 directly therebeneath. Retaining plates or sections 58 overlie the cam plates 56 for retaining the upper cams 52 in position. The plates 58 and upper and lower cam plates 56 and 54 are secured together by bolts 59. Said plates or sections 54, 56 and 58 are preferably co-extensive in length, the ends of the sections meeting above the brackets 55. Bolts 60 secure the sections to the brackets. It will thus be seen that any section can readily be removed from the machine by removing the corresponding bolts 60.

The construction and operation of the individual cams can perhaps best be understood by reference to Figs. 3, 4 and 5 which show a construction adapted for a single ring or series of cams. Each cam comprises a head 61 and a shank 62. Each head comprises a front face 63 and inclined lateral faces 64. The rear end of each shank 62 is bifurcated to receive the forward end of a latch 65 connected to the shank by a pivot pin 66. The cams 61 are arranged in a double row, the upper cams alternating with the lower cams, being arranged in staggered relation, as clearly shown in Fig. 3. The cam plate 54 is formed on its upper face with integral, channel-shaped bearing blocks 54ª providing slideways 68 for the shanks 62 of the upper cams. The side walls of these slideways constitute spacing ribs 67 by which the shanks 62 are spaced apart. The slideways 68 for the shanks of the upper cams alternate with slideways or channels 69 for the shanks of the lower cams.

The bifurcated end of the shank 62 is made of double thickness or depth by means of a vertical offset portion 70. It will be noted that the upper cams are arranged with these offset portions turned downward and the lower cams with said offset portions facing upward. The arrangement is such that the upper faces of all said bifurcated ends of the shanks are in the same horizontal plane. The lower faces are likewise in the same plane. The retaining plate 58 overlies all of the shanks 62 and secures the cams against removal while permitting them to be adjusted to and from operative position, as presently described. This retaining plate rests on the ribs 67 and is provided with downwardly extended portions 71 fitted within the channels 69 and forming the upper walls of the ways 69.

Each latch 65 is formed with a notch 72 to engage a keeper 73 consisting of a holding rib or flange formed along the rear edge of the cam plate 54, thereby holding the cam in its retracted or inoperative position. The cam is moved to operative position by lifting the latch by means of a finger piece 74 and sliding the cam forward. The latch is then released and drops back to a horizontal position in which a shoulder 75 thereon engages in front of the keeper 73, thus locking the cam against rearward movement. It will be observed that the lower cams are identical in construction with the upper cams, except that they are inverted, the latches for both upper and lower cams being connected so that the holding notches 72 face downward.

By reference to Fig. 6, it will be seen that the faces of the cam rolls 35 and 36 are of sufficient depth to engage the cam faces 63 of both the upper and lower cams of a group, so that the adjacent cam faces 63, although in staggered relation, provide in effect a continuous cam face or track, the extent of which is determined by the number of individual cams that are set to operative position.

If desired, a complete ring of cam plates and cams may be mounted on the cam table, but in practice this will ordinarily not be necessary. As shown in Fig. 1, the cam rings are made of a plurality of units, each comprising an upper cam plate or section 54 with a group of twenty cams 52 thereon and a lower cam plate 56 carrying a group of twenty cams. The length of these units and number of individual cams thereon may of course be varied. Any desired number of these units may be placed on the machine at such positions as they are required. The particular point at which, during the rotation of the mold carriage, a valve (26 or 27) is opened may then be adjusted by adjusting the individual cams of a group. The length of time the valve remains open may likewise be adjusted by adjusting a greater or less number of cams in the group into operative position. As it only takes an instant to move a cam from an operative to an inoperative position, or vice versa, these adjustments can readily be made without interfering with the continuous operation of the machine.

Modifications may be resorted to within the spirit and scope of my invention.

What I claim is:

1. In a machine of the character described, the combination of a rotating support, a non-rotating support, a group of cams carried by one of said supports and arranged to provide an extended cam surface, a cam actuated device carried by the other of said supports, means for adjusting the individual cams and thereby varying the effective length of the cam surface, said adjusting means including latches pivoted to the cams, and a keeper cooperating with the latches for locking the cams in adjusted position.

2. The combination of a carriage rotatable about a vertical axis and including a rotating support, a stationary support, a group of cams mounted on one of said supports, a cam actuated device mounted on the other of said supports, said cams having cam faces arranged in tandem and forming an extended cam surface concentric with said axis of rotation, means for moving the individual cams into and out of operative position and thereby varying the length of the cam surface and its position relative to its support, said means including latches individual to the cams, and means cooperating with the latches for locking the cams in either position.

3. The combination of a cam, a support therefor, a latch connected to said cam, said cam shiftable on said support to operative and inoperative positions, and means cooperating with said latch to hold the cam in either of said positions.

4. The combination of a cam, a latch pivoted thereto, and a keeper to engage said latch and hold the cam in either an operative or an inoperative position.

5. The combination of a supporting plate, a plurality of cams slidably mounted thereon for movement into and out of operative position, said cams arranged side by side to form an extended cam surface when the cams are in operative position, latches individual to said cams and connected thereto, and means cooperating with the latches for holding the individual cams in either said position.

6. The combination of a cam and a support therefor, said cam comprising a head and a rearwardly extending shank, said head having a front cam face extending transversely of the axis of said shank and inclined faces extending rearwardly and outwardly from said front face, said cam being adjustable forwardly and rearwardly into and out of operative position, and means for holding it in either of said positions.

7. The combination of a cam and a support therefor, said cam comprising a head and a rearwardly extending shank, said head having a front cam face extending transversely of the axis of said shank and inclined faces extending rearwardly and outwardly from said front face, said cam being shiftable forwardly and rearwardly on said support into operative and inoperative positions, a latch connected to said shank, and a keeper on said support coperating with the latch to hold the cam.

8. The combination of a cam supporting plate, a cam slidably mounted thereon for movement to operative and inoperative positions, a latch pivoted to the cam, and a keeper on said plate arranged to engage the latch and hold the cam in either operative or inoperative position.

9. The combination of a cam supporting plate, a group of cams slidably mounted thereon for movement to operative and inoperative positions, said group comprising upper and lower cams arranged in staggered relation with upper and lower cams alternating and forming an extended cam surface, and means for adjusting the individual cams into and out of operative position and thereby varying the length and position of said cam surface.

10. The combination of a circular cam table, a plurality of arc shaped cam plates arranged end to end concentrically of the table, means for removably attaching said plates to the table, permitting each individual plate to be removed independently of the others, groups of cams mounted on said plates, the faces of said cams being arranged in an arc to form an extended cam surface or track concentric with said axis, and means for individually adjusting the cams into and out of operative position to vary the length and position of the cam track.

11. The combination of a circular cam table, an annular series of brackets mounted on said table, arc shaped cam plates arranged end to end concentrically with the table, the ends of each said cam plate being supported on and removably attached to adjoining brackets, and a group of cams mounted on each cam plate with their cam faces arranged in an arc concentric with said table to form an extended arc shaped cam surface or track, each cam group forming a continuation of the adjoining cam group, the individual cams being adjustable radially inward to inoperative positions for varying the length and position of the cam track.

12. The combination of a circular cam table, an annular series of brackets mounted on said table, arc shaped cam plates arranged end to end concentrically with the table, the ends of each said cam plate being supported on and removably attached to adjoining brackets, a group of cams mounted on each cam plate with their cam faces arranged in an arc concentric with said table to form an extended arc shaped cam surface or track, each cam group forming a continuation of the adjoining cam group, the individual cams being slidably mounted on the cam plates for radial movement into and out of operative position, latches pivoted to the cams, and a keeper cooperating with said latches for holding them in adjusted position.

13. The combination of a cam, a support on which the cam is mounted, said cam shiftable on the support to operative and inoperative positions, and gravity operated means for automatically locking the cam in either of said positions.

14. The combination of a supporting plate, a plurality of cams slidably mounted thereon for individual movement into operative and inoperative positions, said cams arranged side by side to form an extended cam surface when the cams are in operative position, and gravity operated means individual to the cams for automatically locking each cam in either said position.

Signed at Toledo, Ohio, this 2nd day of August, 1928.

RUSSELL G. ALLEN.